United States Patent

[11] 3,619,222

[72] Inventors Ernest E. Werle
 Riverside;
 Thomas F. Mitchell, Arlington Heights, both of Ill.
[21] Appl. No. 8,019
[22] Filed Feb. 2, 1970
[45] Patented Nov. 9, 1971
[73] Assignee Darling & Company
 Chicago, Ill.

[54] MODIFIED PROTEIN COMPOSITION AND METHOD OF FORMING INSOLUBLE SEALS
 10 Claims, No Drawings
[52] U.S. Cl....................................................... 106/123,
 106/126, 106/139, 106/154, 106/156, 117/147, 117/157, 117/164
[51] Int. Cl...................................................... C08h 15/02
[50] Field of Search............................................. 117/156, 157, 147; 106/123, 154, 126, 139

[56] References Cited
UNITED STATES PATENTS
2,457,357 12/1948 Fenn ........................... 106/123
2,579,482 12/1951 Fenn ........................... 109/123
FOREIGN PATENTS
679,819 2/1964 Canada ....................... 106/123

Primary Examiner—Morris Liebman
Assistant Examiner—T. Morris
Attorney—Hibben, Noyes and Bicknell ABSTRACT: An adhesive composition having thermosetting and/or thermoplastic properties comprising a protein, such as animal glue, uniformly mixed with a lignosulfonate and polyhydric composition, such as sorbitol, glycerine or ethylene glycol, which can contain water as a carrier, and which on heating forms a water insoluble seal.

MODIFIED PROTEIN COMPOSITION AND METHOD OF FORMING INSOLUBLE SEALS

SPECIFICATION

This invention relates to modifying materials derived from protein and more particularly to compositions containing material derived from collagen, such as glues and gelatins, casein and soy protein which can be used as an adhesive having thermoplastic and/or thermosetting properties and to an inexpensive method of forming a water insoluble seal.

Protein materials are widely used in chemical compositions for preparing adhesives, coatings and the like. The material derived from collagen protein materials, in particular, are quite important industrially. Collagen, one of the chief constituents of connective tissues and the organic substances of bones, has long been used for many industrial purposes in the form of glues and gelatins. Glue, for example, has long been known to be a good adhesive, particularly for porous materials such as paper, cloth and the like. A number of ways have been found to modify collagen itself and collagen derivatives, such as glue, to give certain additional and desirable properties including greater water insolubility, physical strength through cross-linking and the like. In general, however, considerable expense is involved in modifying the protein material or its derivatives and undesirable properties are often present, such as short pot like, or noxious fumes.

The method of modifying protein derivatives and collagen derivatives in particular, as described herein, is applicable to protein derivatives, and in particular to those derived from collagen, the latter being primarily gelatins and glues. The detailed description of this invention will, however, be given in terms of modifying glues; but it is not meant to limit the invention to this class of callagen derivatives, as the description in terms of glue is used merely for brevity of presentation. In the following description the term "glue" will therefore be used to describe a material derived from protein, whether animal or vegetable. Thus, it will be distinguished from synthetic materials and natural latices which are used as adhesives and sometimes generally called glues.

Although animal base glues have found wide acceptance as adhesives they process certain inherent disadvantages in their use in this role. For example, animal glues of commerce do not form highly water resistant compounds and thus are unsuited for many uses where exposure to a highly humid atmosphere or prolonged contact with water are encountered, because they lack thermosetting or water insolubility properties. Various synthetic adhesives have been developed to overcome the specific limitations associated with animal glue. Some of the newer adhesives are thermoplastic materials which can be converted by heating to a liquid and then applied to a substrate in this state. However, these synthetic adhesives also possess certain inherent disadvantages, among which are the high cost thereof and the more complicated application procedures which are required.

It is therefore an object of the present invention to provide a modified protein derivative, particularly animal glue and gelatin, which has thermosetting and/or thermoplastic properties.

Another object of the present invention is to provide an inexpensive modified protein derivative material, particularly animal glue and gelatin, which can be readily applied in a thin film ad dried, which can thereafter be stored for long periods without blocking, and which can thereafter be activated by heat to form a thermosetting water-insoluble bond.

Still another object of the present invention is to provide an inexpensive modified protein derivative material, particularly animal glue and gelatin, which can be applied inexpensively as a thin film on a substrate from an aqueous solution or as a hot melt and which can thereafter be activated and rendered water insoluble by the application of controlled heat.

It is also an object of the present invention to provide an inexpensive method of forming a water resistant heat seal with an adhesive derived from protein.

Other objects of the present invention will be apparent to those skilled in the art from the following detailed description and claims to follow.

It has been found possible to achieve the foregoing objects of the invention by treating a protein material, particularly animal glue and gelatin, with a polyol compound and also preferably combined with a lignin extract, preferably a lignin sulfonate, by dissolving the protein material in the polyol compound and the lignin extract material, with water being added, if required, to impart the degree of fluidity required for the particular application intended.

The polyol compounds which can be used in the present invention include the class of the polyhydric aliphatic ad polyhydric aromatic compounds, including ethylene glycol, glycerine, sorbitol, triethanolamine, partially polymerized polyols formed on distillation of glycerine and sorbitol or the like polyhydric compounds, and polyhydroxy benzene compounds, such as hydroquinone and resorcinol. If desired, the polyol compounds can have substituent groups on the skeleton thereof, including such groups as amino, alkyl, alkoxy, imino, halo, carbonyl and moieties where the acyclic polyol is a derivative of an aromatic, heterocyclic or polymeric compound. The polyol "Sutro" used in the specific examples is sold by Atlas Chemical Ind., Inc., Wilmington, Del., and is a mixture of polymerized polyhydric aliphatic compounds produced during distillation of sorbitol, mannitol, and glycerol.

The lignin extract used in the present invention is preferably a lignin sulfonate extract material which has been recovered from spent sulfite liquors produced by treatment of wood pulp and comprises in addition to lignin sulfonate, sugars and minor amounts of inorganic salts. The lignin sulfonates of commerce are usually sold as salts of sulfonic acid, such as calcium lignosulfonate. The lignosulfonate compounds are used in the salt form. The lignin sulfonate extract "Stapel" used in the specific examples of the present invention is sold by Consolidated Paper, Inc., Appleton, Wisconsin, and has the following analysis:

| | |
|---|---|
| Calcium lignosulfonate | 65% |
| Reduced sugars | 20% |
| Ash | 12% |
| Calcium | 4% |
| Sulfur | 6% |
| Sp. G. | 1.27 at 60° F. |
| pH | 4.5 |
| Viscosity | 120 cp. at 60° F. |

Other water or polyol soluble lignin extracts, however, can be used in the present invention, and the present invention is not limited to the preferred lignin sulfonate extract described herein.

The preferred protein derived materials used in the present invention are the derivatives of collagen, animal glues and gelatin, which are made from animal bones and animal hides in accordance with conventional processes for making bone glue, hide glue and gelatin. Animal glues and gelatin of any of the various grades can be used in the present invention in accordance with the requirements of the intended use. Other protein materials, both animal and vegetable, such as casein, soya protein, and the like, can also be used in the present invention to form modified protein compositions in the same manner as described herein for the collagen derived materials, animal glue and gelatin.

The several modified protein derivative compositions of the present invention which exhibit both thermoplastic and thermosetting properties under the controlled heating conditions described herein when applied as a thin film on a substrate are prepared by dissolving the protein derivative material in the polyol compound and lignin material with the aid of water or polyol compound as a solvent, if desired, to form a uniform solution. The sequence in which the ingredients are dissolved to form the solution or the interchange of solvents is not significant. In general, the protein derivative material, such as glue, the polyol compound, such as glycerin or sorbitol, and the lignin extract material which is preferably the unrefined lignin sulfonate, are combined in roughly equal proportions, although considerable variations in the proportions of the individual component can be made dependent on the particular use intended. For example, where it is not necessary that the modified protein derivative composition be rapidly converted to the insoluble form within a period of a few minutes or seconds, the amount of lignin sulfonate extract can be reduced or even eliminated, if desired. The water content of the composition can also be varied considerably or can be omitted entirely and polyol used as the vehicle, but generally water is used in an amount required to facilitate handling or application of the material in a manner and with the apparatus desired.

The compositions of the present invention have particularly valuable properties as a laminating adhesive for use in producing heat seal tapes, veneer tapes, laminating kraft paper and in the manufacture of plywood laminates. In the use of the present invention in manufacturing heat seal tapes, for example, the composition is applied to a flexible paper or synthetic composition strip which preferably is porous as a thin film, usually, but not necessarily, as an aqueous solution at a temperature of about 170° F. and dried at a temperature around 230° F. to provide a thin film (i.e. about 6 pounds per 3,000 square feet). If desired, the novel composition of the present invention can be formulated without water and applied as a hot melt at a temperature of about 200° F. and then the drying step can be omitted. When the tape is to be sealably applied to another surface, it is heated to a temperature above about 230° F. to activate the thermoplastic properties thereof and is applied under slight pressure. Where it is desired to provide a seal which is resistant to water and/or grease, the thin film, preferably dry, is heated at a temperature between about 290° F. and 575° F. for a short period to effect transformation of the film into an insoluble form which is resistant to water and grease penetration. If desired, the formation of the insoluble film can be effected by heating at a lower temperature for a prolonged period, such as 15 hours at about 230° F.

The compositions of the present invention are fully compatible with materials, such as starch, waxes, resins and synthetic latices, and one or more of the latter materials can be combined with the composition of the present invention to provide compositions having special properties. For example, clear rosin or paraffin wax can be used with the composition of the present invention without detracting from the water resistant properties of the composition to form a useful hot melt adhesive which can be applied in the conventional manner and with conventional apparatus. Other useful additives, such as inert filler clays, can be used with the composition of the present invention, if desired.

In order to further illustrate the present invention without, however, limiting the invention to the particular materials and portions specified, the following specific examples and illustrations are given.

EXAMPLE 1

A uniform adhesive solution was prepared containing equal parts by weight of the following ingredients:
92 gram Bone Glue
Stapel (lignin sulfonate extract)
88% Glycerine
Water The adhesive solution was applied with a No. 24 Meyer rod to 60-pound kraft paper and immediately combined with a second sheet of the kraft paper to form a laminate. The laminate was dried for two minutes in an oven at 230° F. Test specimens in the form of 1 inch square sections were cut from the dried laminate and heated between platens of a Carver press at a pressure of 50 p.s.i.g. for the time and at the temperatures indicated in the following table I.

The heated specimens were then placed in boiling water for four minutes and examined while still wet to determine whether the adhesive film was:
a. water resistant (remained sealed, but could be parted without damaging substrate)
b. water insoluble (remained sealed and could be parted only by tearing paper fiber)

The results of the examination are given in the following table I:

TABLE I

| Temperature (°F.) | Time at temperature to obtain bond | |
|---|---|---|
| | Water Resistant | Water Insoluble |
| 260 | 420 secs. | 660 secs. |
| 290 | 30 secs. | 60 secs. |
| 330 | 1 sec. | 15 secs. |
| 360 | 1 sec. | 5 secs. |

EXAMPLE 2

A uniform adhesive solution containing equal parts of 92 gram bone glue, Stapel, 70% sorbitol aqueous solution, and water was prepared, applied and tested as in example 1.

The results of the examination of the test specimens are given in the following table II:

TABLE II

| (°F) | Water Resistant | Water Insoluble |
|---|---|---|
| 260 | 420 secs. | 660 secs. |
| 290 | 60 secs. | 240 secs. |
| 360 | 5 secs. | 30 secs. |

EXAMPLE 3

A uniform adhesive solution containing equal parts of 92 gram glue, 88% glycerine and water were prepared and applied and tested as in example 1.

The results of the examination of the test specimens are given in the following table III:

TABLE III

| Temperature (°F.) | Time at temperature to obtain bond | |
|---|---|---|
| | Water Resistant | Water Insoluble |
| 260 | Not obtained | |
| 290 | 1800 secs. | 2700 secs. |
| 330 | 60 secs. | 240 secs. |
| 360 | 30 secs. | 105 secs. |
| 400 | 10 secs. | 12 secs. |

EXAMPLE 4

A uniform adhesive solution containing equal parts of 92 gram glue, 70% sorbitol solution and water was prepared, applied and tested as in the manner of example 1.

The results of the examination of the test specimens are given in the following table IV:

TABLE IV

| Temperature (°F.) | Time at temperature to obtain bond | |
|---|---|---|
| | Water Resistant | Water Insoluble |
| 260 | Not obtained | |
| 290 | 1800 secs. | 2700 secs. |

| | | |
|---|---|---|
| 330 | 900 secs. | 1800 secs. |
| 360 | 300 secs. | 1020 secs. |

It will be evident from the foregoing examples 1-4 that the adhesive bonds containing Stapel develop water resistance and insolubility to water and the desired strong bond resulting in fiber tear much more rapidly than when the film contains no Stapel.

EXAMPLE 5

A uniform adhesive solution was prepared containing equal parts by weight of 177 gram hide glue, Stapel, a polyol, and water.

Each solution was applied with a No. 24 Meyer rod to sections of 60-pound kraft paper, dried in an oven for 2 minutes at 230° F., heated on a hot plate for the time and temperatures indicated in table V, immersed in boiling water for 4 minutes and dried on a steam plate. The boiled test sections were compared with coated and heated sections which had not been boiled and the relative amount of film remaining was noted. If the boiled film was not as thick as the unboiled film a second test section was heated on a hot plate for a longer period at the specified temperature until the film thickness after boiling was as thick as the unboiled film, thereby indicating insolubilization of the heated film. All of the heating times indicated at a specific temperature in table V produced boiled films having the same thickness as the unboiled films.

The results of the examination are given in the following table V:

TABLE V

| Hot plate temperature (° F.) | Polyol | | | |
|---|---|---|---|---|
| | 88% glycerine | 70% sorbitol | Ethylene glycol | Sutro |
| 300, seconds | 120 | 120 | 60 | 108 |
| 310, seconds | 120 | 60 | 60 | 108 |
| 320, seconds | 120 | 35 | 40 | 78 |
| 330, seconds | 30 | 35 | 30 | 72 |
| 340, seconds | 30 | 25 | 30 | 55 |
| 350, seconds | 30 | 15 | 30 | 55 |
| 360, seconds | 30 | 15 | 30 | 50 |
| 370, seconds | 15 | 12 | 20 | 40 |
| 380, seconds | 15 | 10 | 20 | 40 |
| 390, seconds | 8 | 8 | 10 | 30 |

EXAMPLE 6

A uniform adhesive solution was prepared containing equal parts by weight of 92 gram bone glue and a polyol compound specified in table VI, applied and tested as in example 5. The results of the examination of the test sections is given in the following table VI:

TABLE VI

| Hot plate temperature (° F.) | Polyol | | | | | |
|---|---|---|---|---|---|---|
| | 88% glycerine | | 70% sorbitol | | Ethylene glycol | Sutro, mins. |
| | Hrs. | Min. | Hrs. | Min. | Hrs. Min. | |
| 310 | 2 | | | | | |
| 330 | 1.75 | | | | 2 | |
| 340 | 1.7 | | | | | |
| 350 | 1.5 | | | | 90 | |
| 360 | 1.5 | | | | 90 | |
| 370 | 1 | | | | 80 | |
| 380 | | 40 | 2 | | 60 | 45 |
| 390 | | 25 | | 55 | 25 | 40 |
| | | | | | 14 | 35 |

EXAMPLE 7

A uniform adhesive solution was prepared containing equal parts by weight of 177 gram hide glue, Stapel, and a polyol compound indicated in table VII. Each solution was applied as a thin film to a glass plate and heated at a temperature of 340° F. for 5 minutes. The test plates were examined to determine the percentage of film insolubilized. The test results are shown in the following table VII:

TABLE VII

| | Percent insoluble | |
|---|---|---|
| | Glue plus stapel plus polyol | 177 gram hide glue alone |
| Polyol: | | |
| Glycerine | 48 | 0 |
| Sorbitol | 93 | 0 |
| Sutro | 51 | 0 |
| Ethylene glycol | 59 | 0 |

EXAMPLE 8.

A uniform adhesive solution was prepared from the ingredients indicated in the following Table VIII to provide composition A, B, C and D having the indicated proportions of ingredients:

TABLE VIII

| | Percent parts ingredients (by weight) | | | |
|---|---|---|---|---|
| Composition | A | B | C | D |
| Ingredients: | | | | |
| 100 grams bone glue | 20 | 20 | 40 | 25 |
| Stapel | 20 | 20 | 20 | 25 |
| Glycerine | 30 | 15 | 10 | 25 |
| Water | 30 | 45 | 30 | 25 |

Each of the Compositions A, B, C and D was heated to 140° F. to form a fluid solution which was then coated on a strip of kraft paper and the coating was dried for 2 minutes in an oven at 230° F. Each of the coated strips of paper formed a firm bond to chipboard, when the coated strip was heated to between 170° F. and 250° F. and applied to the chipboard at a pressure of 50 p.s.i. for a period of ½ second.

Similar results were obtained when ethylene glycol was used in place of glycerine in the proportions specified in the foregoing table VIII.

EXAMPLE 9

A uniform adhesive solution was prepared from the following ingredients used in the specified proportions:

| Ingredients | % Parts Ingredients (by wt.) |
|---|---|
| 100 g. Bone Glue | 25 |
| Stapel | 25 |
| Sorbitol | 25 |
| Water | 25 |

This composition was coated on 90-pound kraft and 60-pound kraft in the usual manner to form a roll of heat seal tape. The adhesive film formed was not tacky at normal temperatures and the roll of heat seal tape without further treatment or modification did not block during storage. The roll of heat seal tape formed was in all respects a satisfactory heat seal tape suitable for commercial application.

EXAMPLE 10

A uniform adhesive solution was prepared in the foregoing described manner with the following ingredients used in the indicated proportions:

| Ingredients | Parts by Weight |
| --- | --- |
| 92 g. Bone Glue | 50 |
| Stapel | 50 |
| Resorcinol | 46 |
| Water | 62 |

After the solution was prepared, it was coated at 140° F. on both 90-pound kraft and 60-pound kraft paper tape with a number 6 R.D.S. rod. The coated specimens were dried 2 minutes at 230° F.

Samples were tested for sealing qualities on a Pack-Rite Tester at 1400 p.s.i. and ¼ second. The 60-pound stay tape sealed well at 400° F. and the 90-pound stay tape sealed well at 500° F.

Samples of the latter coated tape were sealed to 60-pound kraft paper at 50 p.s.i., and 500° F. for 5 seconds on the Pack-Rite Tester. The laminated samples were immersed in water at room temperature for 1 hour and then the water was boiled for 10 minutes. The samples remained firmly laminated. When removed from the water the laminates were separated only when the paper substrates were torn.

EXAMPLE 11

A uniform adhesive solution was prepared in the foregoing described manner with the following ingredients used in the indicated proportions:

| Ingredients | Parts by Weight |
| --- | --- |
| 92 g. Bone Glue | 50 |
| Stapel | 50 |
| Hydroquinone | 46 |
| Water | 62 |

After the solution was prepared, it was coated at 140° F. on both 90-pound kraft and 60-pound kraft paper tape with a number 6 R.D.S. rod. The coated specimens were dried 2 minutes at 230° F.

Samples were tested for sealing qualities on a Pack-Rite Tester at 1400 p.s.i. and ¼ second. The 60-pound stay tape sealed well at 350° to 425° F. and the 90-pound stay tape sealed well at 425° to 500° F.

Samples of the latter coated tape were sealed to 60-pound kraft paper at 50 p.s.i., 500° F. for 5 seconds on the Pack-Rite Tester. The laminated samples were immersed in water at room temperature for 1 hour and then the water was boiled for 10 minutes. The samples remained firmly laminated. When removed from the water the laminates were separated only when the paper substrates were torn.

EXAMPLE 12

A uniform adhesive solution was prepared in the foregoing described manner with the following ingredients used in the indicated proportions:

| Ingredients | Parts by Weight |
| --- | --- |
| Casein | 50 |
| 88% Glycerine | 50 |
| Stapel | 15 |
| Triethanolamine | 15 |
| Water | 100 |

The solution was coated on 60-pound kraft paper tape with a number 6 R.D.S. rod and dried at 230° F. for 2 minutes. The coated kraft paper tape was sealed to chipboard in a Pack-Rite Tester at 1400 p.s.i. and ¼ second. Commercially effective heat seals were obtained with temperatures ranging from 325° to 575° F.

Samples of the latter coated tape were sealed to 60-pound kraft paper at 50 p.s.i., and 500° F. for 5 seconds on Pack-Rite Tester. The laminated samples were immersed in water at room temperature for 1 hour, and then water was boiled for 10 minutes. The samples remained firmly laminated. When removed from the water the laminates were separated only when the paper substrates were torn.

EXAMPLE 13

A uniform adhesive solution was prepared in the foregoing described manner with the following ingredients used in the indicated proportions:

| Ingredients | Parts by Weight |
| --- | --- |
| Delta Soy Protein | 16.7 |
| 88% Glycerine | 16.7 |
| Stapel | 13.3 |
| Triethanolamine | 3.3 |
| Water | 50.0 |

The solution was coated on 60-pound kraft paper tape with a number 6 R.D.S. rod at 140° F. The coated tape was dried for 2 minutes at 230° F. The coated kraft tape was sealed to chipboard on Pack-Rite Tester at 1400 p.s.i. at ¼ second at temperatures ranging from 350° F. to 575° F.

EXAMPLE 14

Aqueous solutions of bone glue (100 g. test) were prepared by stirring the glue and water in the amounts indicated in the following table IX for 30 minutes and holding on a constant temperature bath at 130° F. until all the glue was dissolved. Before adding the indicated amount of lignosulfonate (Stapel) and polyhydric compound, the loss of water due to evaporation during preparation of the glue solution was compensated for by addition of the required amount of water. While the glue solution was maintained at a temperature of 130° F. the indicated amount of Stapel and polyhydric compound was added to each glue solution and mixed to form a uniform adhesive composition having formulation specified in the following table IX:

TABLE IX

| Formulation Number | Glue (grams) | Water (grams) | Stapel (grams) | Polyhydric compound | | |
| --- | --- | --- | --- | --- | --- | --- |
| | | | | Glycerine (grams) | Diethylene glycol (grams) | Ethylene glycol (grams) |
| 1 | 125 | 125 | 125 | 125 | | |
| 2 | 153.3 | 153.3 | 153.3 | 40 | | |
| 3 | 163.3 | 163.3 | 163.3 | 8 | | |
| 4 | 125 | 125 | 125 | | 125 | |
| 5 | 153.3 | 153.3 | 153.3 | | 40 | |
| 6 | 163.3 | 163.3 | 163.3 | | 8 | |
| 7 | 125 | 125 | 125 | | | 125 |
| 8 | 153.3 | 153.3 | 153.3 | | | 40 |
| 9 | 163.3 | 163.3 | 163.3 | | | 8 |

A. Thermosetting Properties

Each of the above adhesive Formulations 1 through 9 was applied with a No. 24 Meyer rod to a 1"×15" section of 60-pound kraft paper and immediately combined with a second sheet of the kraft paper to form a laminate. Each laminate was dried for 2 minutes in an oven at a temperature of 230° F. Each test laminate was cured at temperatures of 300° F. for periods of 60 seconds, immersed in boiling water for a period of 4 minutes, removed, dried, and tested by pulling the laminated sections and observing whether fiber tear occurs and observing water resistance. The results observed are shown in the following table X:

TABLE X

| Formulation Number | Polyhydric weight percent (dry basis) | Fiber tear | Remark |
| --- | --- | --- | --- |
| 1 | 33.3% glycerine | Negative | PWR |
| 2 | 11.5% glycerine | Positive | GWR |
| 3 | 2.4% glycerine | Negative | PWR |
| 4 | 33.3% diethylene glycol | Positive | GWR |
| 5 | 11.5% diethylene glycol | Slight | FWR |
| 6 | 2.4% diethylene glycol | Positive | GWR |
| 7 | 33.3% ethylene glycol | do | GWR |
| 8 | 11.5% ethylene glycol | do | GWR |
| 9 | 2.4% ethylene glycol | do | GWR |

NOTE.— GWR = Good water resistance, FWR = Fair water resistance

In order to evaluate further the water insolubility of the Formulations 1 through 9, microslides were coated with each of the test formulations using a No. 24 Meyer rod, the coatings dried at 230° F. for 2 minutes, cooled in a desiccator and weighed. Thereafter, the slides were cured at 340° F. for 5 minutes, cooled and reweighed. The cured slides were then placed in separate beakers containing boiling water for a period of 4 minutes, removed, redried at 230° F. for 3 minutes, cooled and again weighed. The amount of water insoluble adhesive remaining was recorded as the percent of water insoluble material in the cured seal. The results obtained are shown in the following table XI:

TABLE XI

| Formulation No. | Polyhydric Cpd., % by wt. (dry basis) | | % Water Insol. |
|---|---|---|---|
| 1 | Glycerine | 33.3% | 77.17 |
| 2 | Glycerine | 11.5% | 73.20 |
| 3 | Glycerine | 2.4% | 54.26 |
| 4 | Diethylene Glycol | 33.3% | 68.53 |
| 5 | Diethylene Glycol | 11.5% | 82.03 |
| 6 | Diethylene Glycol | 2.4% | 44.91 |
| 7 | Ethylene Glycol | 33.3 | 109.00 |
| 8 | Ethylene Glycol | 11.5 | 64.70 |
| 9 | Ethylene Glycol | 2.4 | 64.24 |

B. Thermoplastic Properties

Each of the Formulations 1 through 9 (See table IX) was applied with a No. 24 Meyer rod to 60-pound kraft paper strips, the coated strips dried in an oven at 230° F. for 3 minutes, and then stored in a dessicator. Each of the dried test strips was tested for thermoplastic sealing properties on a Pack-Rite Tester. The dry coated test strip of each of the several formulations was placed over the smooth surface of a section of chipboard and the combination inserted between the pressure jaws of the tester so as to cover the full width of the jaws. The air pressure gauge of the tester was set at approximately 92.5 p.s.i. to give a pressure of about 700 p.s.i. on the ½"×¾" seal area. The duration of the pressure was set for ¼ second, and if no fiber test was observed a like sample was rerun on the rough surface of the chipboard at a period of ½ second. The temperature of the heat seal tests were at 250° F. and increased by 50° F. intervals. The resulting seal is inspected immediately after the release of the test jaws and the seal evaluated in accordance with the following scale:
0—no fiber tear
1—slight tear
2—about 30% tear
3—about 60% tear
4—about 80% tear
5—about 100% tear The results obtained from testing the Formulations 1 through 9 are shown in the following tables XII A, XII B and XII C:

TABLE XII A

| Strip coated with: | Temperature, ° F. | Degree of seal | |
|---|---|---|---|
| | | ¼ second dwell | ½ second dwell |
| Formulation No. 1 (glycerine) | 250 | 0 | 5 |
| | 300 | 4 | 5 |
| | 350 | 5 | 5 |
| | 375 | 2 | 5 |
| | 400 | 5 | 5 |
| Formulation No. 2 (glycerine) | 250 | 0 | 0 |
| | 300 | 0 | 0 |
| | 350 | 0 | 0 |
| | 375 | 0 | 0 |
| | 400 | 0 | 2 |
| Formulation No. 3 (glycerine) | 250 | 0 | 0 |
| | 300 | 0 | 0 |
| | 350 | 0 | 0 |
| | 375 | 0 | 0 |
| | 400 | 0 | 1 |

TABLE XII B

| Strip coated with: | Temperature, ° F. | Degree of seal | |
|---|---|---|---|
| | | ¼ second dwell | ½ second dwell |
| Formulation No. 4 (diethylene glycol) | 250 | 0 | 0 |
| | 300 | 0 | 2 |
| | 350 | 5 | 5 |
| | 375 | 3 | 5 |
| | 400 | 5 | 5 |
| Formulation No. 5 (diethylene glycol) | 250 | 0 | 0 |
| | 300 | 0 | 0 |
| | 350 | 0 | 0 |
| | 375 | 0 | 1 |
| | 400 | 0 | 1 |
| Formulation No. 6 (diethylene glycol) | 250 | 0 | 0 |
| | 300 | 0 | 0 |
| | 350 | 0 | 0 |
| | 375 | 0 | 0 |
| | 400 | 0 | 1 |

TABLE XII C

| Strip coated with: | Temperature, ° F. | Degree of seal | |
|---|---|---|---|
| | | ¼ second dwell | ½ second dwell |
| Formulation No. 7 (ethylene glycol) | 250 | 0 | 0 |
| | 300 | 0 | 1 |
| | 350 | 0 | 4 |
| | 375 | 2 | 5 |
| | 400 | 5 | 5 |
| Formulation No. 8 (ethylene glycol) | 250 | 0 | 0 |
| | 300 | 0 | 0 |
| | 350 | 0 | 1 |
| | 375 | 0 | 2 |
| | 400 | 1 | 4 |
| Formulation No. 9 (ethylene glycol) | 250 | 0 | 0 |
| | 300 | 0 | 0 |
| | 350 | 0 | 0 |
| | 375 | 0 | 0 |
| | 400 | 0 | 1 |

It will be evident that the adhesive compositions of the present invention containing a protein and a lignosulfonate in combination with a polyhydric compound as herein disclosed with the polyhydric compound comprising at least about 2.4% by weight. up to about 45% by weight on a dry basis exhibits good thermosetting properties; and where the adhesive composition contains at least about 8% by weight up to about 35% by weight on a dry basis of the polyhydric compound, the adhesive compound exhibits good thermoplastic properties, as well as forming a higher watery resistant seal on heating. It will also be evident that the protein component, which preferably is an animal glue but which can comprise another protein which also has gluelike properties, can be present in an amount at least equal to the amount of the lignin extract up to about 80% by weight on a dry basis; and the amount of lignin extract, which preferably is unrefined calcium lignosulfonate, can be used in preparing the adhesive in an amount comprising between about 10% by weight and 48% by weight on a dry basis.

Where any of the adhesive compositions of the present invention exhibited tackiness after coating and are to be used for heat seal tapes, it is possible to avoid any undesirable blocking during storage by employing any conventional antiblocking agent in the formulation of the adhesive composition or by applying a release agent on the back side of the tape.

While the heat seals formed on the chipboard in Examples 8 and 9 were not resistant to water, these seals can be made water resistant by increasing the temperature to which the tape is heated during the application thereof, or by increasing the time at which the tape is held at the applied temperature, in accordance with the teaching of the preceding examples.

The heat seal tapes formed with the compositions of the present invention can be produced by any of the conventional machinery used for producing ordinary gummed paper tape and can be applied hot and with only superficial cleaning of the machinery, in contrast with the properties of many synthetic adhesive solutions, which can only be applied cold and which require extreme care in cleaning the machinery therewith to avoid contamination by other adhesive compositions which have been used in the machinery. The present adhesive tape coating composition, in addition to being less expensive to manufacture than other products having both, thermoplastic and thermosetting properties, uses a thinner coating of the adhesive on the heat seal tape than is presently required. For example, only about 6 pounds of the present composition is required to coat 3,000 square feet of heat seal tape, as compared with 8 pounds of the presently used adhesive compositions.

Others may practice the invention in any of the numerous ways which are suggested to one skilled in the art by this disclosure, and all such practice of invention are considered to be a part hereof which fall within the scope of the appended claims.

We claim:

1. A modified protein base adhesive composition having thermoplastic and/or thermosetting properties which comprise: a protein selected from the group consisting of animal glue, gelatin, casein and soy protein uniformly mixed with a water soluble polyhydric compound selected from the group consisting of glycerine, ethylene, glycol, polyethylene glycol, sorbitol, residue of sorbitol-glycerine-mannitol synthesis distillation, and triethanolamine; and a lignin extract miscible with the mixture of said protein and said polyhydric compound; said protein being present from an amount at least equal to the amount of said lignin extract up to about 60% by weight on a dry basis, said lignin extract comprising on a dry basis between about 10% by weight and about 48% by weight, and said polyhydric compound comprising on a dry basis at least about 2.5% by weight up to about 45% by weight, with the balance of said composition being essentially water.

2. A modified protein base adhesive composition as in claim 1, wherein said protein is animal glue present in an amount between about 30% and about 60% by weight on a dry basis, said lignin extract is a water soluble lignosulfonate present in an amount between about 30% and about 35% by weight on a dry basis, and said polyhydric compound being present in an amount between about 8% and about 35% by weight on a dry basis.

3. A modified protein base adhesive composition as in claim 2, wherein said protein, said lignosulfonate and said polyhydric compound are present in about equal amounts by weight on a dry basis.

4. A modified protein base adhesive composition as in claim 2, wherein said lignosulfonate is calcium lignosulfonate and said polyhydric compound is sorbitol.

5. A modified protein base adhesive compound as in claim 2, wherein said lignosulfonate is calcium lignosulfonate and said polyhydric compound is glycerine.

6. A modified protein base adhesive composition as in claim 2, wherein said lignosulfonate is calcium lignosulfonate and said polyhydric compound is ethylene glycol.

7. A modified protein base adhesive composition as in claim 2, wherein said lignosulfonate is calcium lignosulfonate and said polyhydric compound is diethylene glycol.

8. A modified protein base adhesive composition as in claim 2, wherein said animal glue is bone glue which comprises 25% by weight, said lignosulfonate is calcium lignosulfonate which comprises 25% by weight, and said polyhydric compound is sorbitol (crystalline solid) which comprises 25% by weight, with the balance comprising 25% by weight water.

9. An article which comprises a dry protein base adhesive coating having thermoplastic and/or thermosetting properties and a substrate on which said coating adhesively secured and wherein said coating comprises in combination a protein selected from the group consisting of animal glue, gelatin, casein, and soy protein uniformly mixed with water soluble polyhydric compound selected from the group consisting of glycerine, ethylene, glycol, polyethylene glycol, sorbitol, residue of sorbitol-glycerine-mannitol synthesis distillation, and triethanolamine; and a lignin extract miscible with the mixture of said protein and said polyhydric compound; said protein being present in an amount at least equal to the amount of said lignin extract up to about 60% by weight on a dry basis, said lignin extract comprising on a dry basis between about 10% and about 48% by weight, and said polyhydric compound comprising on a dry basis at least about 2.5% by weight up to about 45% by weight, with the balance of said composition being essentially water.

10. An article as in claim 9, wherein said substrate is selected from the group consisting of paper, wood laminate and wood veneer.

* * * * *

PO-1050
(5/69)

UNITED STATES PATENT OFFICE
CERTIFICATE OF CORRECTION

Patent No. 3,619,222                    Dated   February 4, 1972

Inventor(s)  Ernest E. Werle and Thomas F. Mitchell

It is certified that error appears in the above-identified patent and that said Letters Patent are hereby corrected as shown below:

Col. 1, line 27, "like" should read --life--; line 34, "callagen" should read --collagen--; line 42, "process" should read --possess--; line 64, "ad" should read --and--; Col. 2, line 13, "ad" should read --and--; Col. 4, lines 15-16, the heading of Table I should read:

TABLE I

| Temperature | Time at Temperature to Obtain Bond | |
|---|---|---|
| (°F) | Water Resistant | Water Insoluble |

; lines 33-36, the upper portion of Table II should read:

TABLE II

| Temperature | Time at Temperature to Obtain Bond | |
|---|---|---|
| (°F) | Water Resistant | Water Insoluble |
| 260 | 420 secs. | 660 secs. |
| 290 | 60 secs. | 240 secs. |

; lines 51-52, the heading of Table III should read:

TABLE III

| Temperature | Time at Temperature to Obtain Bond | |
|---|---|---|
| (°F) | Water Resistant | Water Insoluble |

(continued on page 2)

UNITED STATES PATENT OFFICE
CERTIFICATE OF CORRECTION

Patent No. 3,619,222    Dated February 4, 1972

Inventor(s) Ernest E. Werle and Thomas F. Mitchell

It is certified that error appears in the above-identified patent and that said Letters Patent are hereby corrected as shown below:

; lines 71-72, the heading of Table IV should read:

TABLE IV

| Temperature | Time at Temperature to Obtain Bond | |
| (°F) | Water Resistant | Water Insoluble |
|---|---|---|

; Col. 5, lines 38-45, the term "seconds" after each temperature figure in data column 1 should be cancelled; lines 38-45, after each figure in data columns 2, 3, 4 and 5 of Table V the term "secs." should be added; Col. 6, line 54, the heading for columns 1 and 2 of EXAMPLE 9 should read:

EXAMPLE 9

| Ingredients | % Parts Ingredients (by wt.) |
|---|---|

; and Col. 8, line 49, in the last column of TABLE IX the term "12" should read --125--.

Signed and sealed this 16th day of May 1972.

(SEAL)
Attest:

EDWARD M. FLETCHER, JR.
Attesting Officer

ROBERT GOTTSCHALK
Commissioner of Patents